(12) United States Patent
Walters et al.

(10) Patent No.: US 12,118,538 B2
(45) Date of Patent: Oct. 15, 2024

(54) METHOD FOR ROUTING TO MESH NETWORK CONTENT UTILIZING BLOCKCHAIN TECHNOLOGY

(71) Applicant: Capital One Services, LLC, McLean, VA (US)

(72) Inventors: Austin Grant Walters, Savoy, IL (US); Jeremy Edward Goodsitt, Champaign, IL (US); Fardin Abdi Taghi Abad, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 37 days.

(21) Appl. No.: 17/881,327

(22) Filed: Aug. 4, 2022

(65) Prior Publication Data
US 2022/0374876 A1   Nov. 24, 2022

Related U.S. Application Data

(63) Continuation of application No. 16/742,489, filed on Jan. 14, 2020, now Pat. No. 11,443,303, which is a
(Continued)

(51) Int. Cl.
*G06Q 20/00* (2012.01)
*G06Q 20/36* (2012.01)
(Continued)

(52) U.S. Cl.
CPC ........ *G06Q 20/3678* (2013.01); *H04L 9/0637* (2013.01); *H04L 9/50* (2022.05);
(Continued)

(58) Field of Classification Search
CPC ... H04W 84/18; G06Q 20/367; G06Q 20/065; G06Q 20/223; G06Q 20/3678;
(Continued)

(56) References Cited

U.S. PATENT DOCUMENTS

| 6,868,160 B1 | 3/2005 | Raji |
|---|---|---|
| 10,636,030 B1 | 4/2020 | Walters |

(Continued)

OTHER PUBLICATIONS

Tennekoon et al., "Per Hop Data Encryption Protocol for Transmission of Motion Control Data Over Public Networks", 2014 IEEE 13th International Workshop on Advanced Motion Control (AMC), 2014, pp. 128-133, doi: 10.1109/AMC.2014.6823269.

*Primary Examiner* — Vincent F Boccio
(74) *Attorney, Agent, or Firm* — KDW FIRM PLLC

(57) ABSTRACT

Techniques for routing to content within a mesh network based on a blockchain are provided. An electronic device can receive data from a mesh network to establish the device as a node on the mesh network. The established node can generate a cryptocurrency wallet that can be loaded with an amount of cryptocurrency. A blockchain can store searchable transactions related to content stored within the mesh network. The established node can search the blockchain to locate content and can transmit a request for certain content. The established node may issue a payment to a node hosting the requested content and/or to any intermediate nodes facilitating the established node's access to the content.

18 Claims, 9 Drawing Sheets

Related U.S. Application Data continuation of application No. 16/182,173, filed on Nov. 6, 2018, now Pat. No. 10,579,994.

(51) Int. Cl.
| | |
|---|---|
| *H04L 9/00* | (2022.01) |
| *H04L 9/06* | (2006.01) |
| *H04L 67/568* | (2022.01) |
| *H04W 84/18* | (2009.01) |

(52) U.S. Cl.
CPC ........ *H04L 67/568* (2022.05); *H04L 2209/56* (2013.01); *H04W 84/18* (2013.01)

(58) Field of Classification Search
CPC ............. G06Q 20/832; G06Q 20/3827; G06Q 20/3825; G06Q 2220/00; H04L 9/50; H04L 9/9637; H04L 67/568; H04L 2209/56

USPC ........................................................ 707/825
See application file for complete search history.

(56) References Cited

U.S. PATENT DOCUMENTS

| | | |
|---|---|---|
| 2003/0056093 A1 | 3/2003 | Huitema et al. |
| 2006/0120387 A1* | 6/2006 | Yang ........................ H04L 45/04 370/412 |
| 2007/0147620 A1 | 6/2007 | Zheng |
| 2016/0203522 A1* | 7/2016 | Shiffert .............. G06Q 30/0267 705/14.58 |
| 2016/0283920 A1* | 9/2016 | Fisher ................... H04L 9/3239 |
| 2017/0078493 A1 | 3/2017 | Melika |
| 2017/0201503 A1* | 7/2017 | Jayasena ............. H04L 63/0876 |
| 2018/0018723 A1 | 1/2018 | Nagla et al. |
| 2019/0042228 A1 | 2/2019 | Nolan |
| 2019/0228133 A1* | 7/2019 | Ansari ................. H04L 9/0643 |
| 2020/0120023 A1* | 4/2020 | Munson ................ H04L 9/0643 |

\* cited by examiner

METHOD FOR ROUTING TO MESH NETWORK CONTENT UTILIZING BLOCKCHAIN TECHNOLOGY

CROSS-REFERENCE TO RELATED APPLICATIONS

This application is a continuation of U.S. patent application Ser. No. 16/742,489 filed on Jan. 14, 2020, which is a continuation of U.S. patent application Ser. No. 16/182,173 filed on Nov. 6, 2018 (issued as U.S. Pat. No. 10,579,994 on Mar. 3, 2020). The contents of the aforementioned U.S. patent and patent applications are incorporated herein by reference in their entireties.

TECHNICAL FIELD

Embodiments described herein generally relate to a mesh network.

RELATED APPLICATION

This application is a continuation of U.S. patent application Ser. No. 16/182,173, titled "METHOD FOR ROUTING TO MESH NETWORK CONTENT UTILIZING BLOCKCHAIN TECHNOLOGY" filed on Nov. 6, 2018. The contents of the aforementioned application are incorporated herein by reference in their entirety.

BACKGROUND

Typically, for many conventional mesh networks, access to content requires access to the Internet or requires a central authority. Full access to the Internet may not be available for certain locations where a conventional mesh network is established. Further, if Internet access is available, it may be available to only a few nodes, which can restrict full access to the Internet. Additionally, requiring a central authority to oversee the conventional mesh network can be overly restrictive, reducing the adaptability and flexibility of the network. Accordingly, what is needed is a mesh network that can provide access to content without the need for a central authority.

SUMMARY OF THE DISCLOSURE

This disclosure presents various systems, components, and methods related to using a blockchain within a mesh network. Each of the systems, components, and methods disclosed herein provides one or more advantages over conventional systems, components, and methods.

Various embodiments include techniques for routing to content within a mesh network using a blockchain. Data relating to a mesh network can be received and stored by an electronic device such as, for example, a smartphone. The electronic device can be established as a node on the mesh network based on the stored received data. The established node can generate and store a cryptocurrency wallet. The established node can load the generated cryptocurrency wallet with an amount of cryptocurrency. The blockchain can store searchable transactions related to content stored within the mesh network. The content can be any type of file or information. The established node can search the blockchain to locate content. The established node can transmit a request for desired content and can issue a payment to a node hosting the content. The blockchain can provide a way to route to content stored within the mesh network without the need for a central authority and/or without full Internet access within the mesh network. As a result, the mesh network can be more adaptable and flexible. Other embodiments are disclosed and described.

DETAILED DESCRIPTION

Figure 1:
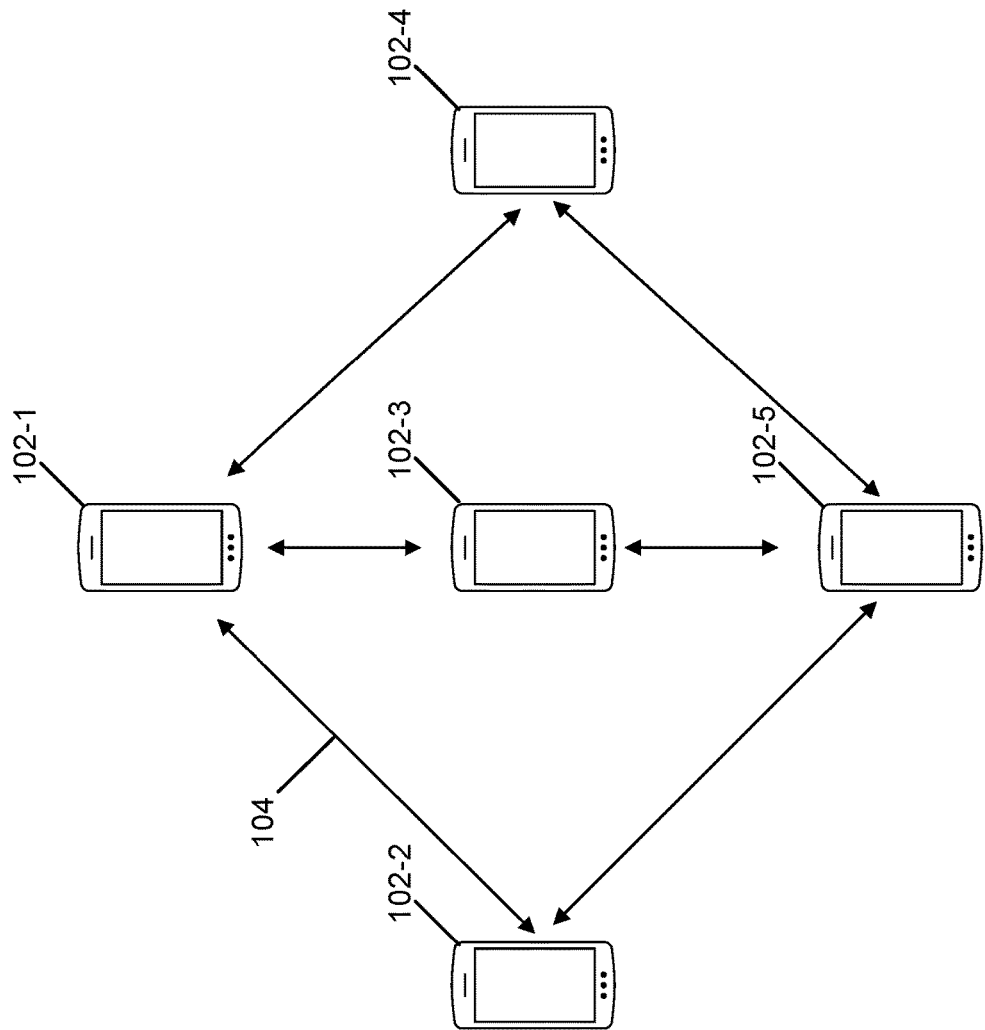
FIG. 1 illustrates an operating environment.

FIG. 1 illustrates an operating environment 100 such as may be representative of various embodiments in which techniques for routing to content in a mesh network may be implemented. The operating environment 100 can be a mesh network and can include a first node 102-1, a second node 102-2, a third node 102-3, a fourth node 102-4, and a fifth node 104-5 node. The mesh network 100 is not limited to the number of nodes depicted in FIG. 1.

The mesh network 100 can include one or more nodes 102 that host content. The content can be any type of file such as, for example, a file related to a website, a video file, an audio file, an image file, a multimedia file, or any type of file that can be provided to any other node 102. In various embodiments, any node 102 can be allowed or permitted to host content. In various embodiments, only certain nodes 102—for example, authorized or registered nodes 102—may be allowed to host content. In various embodiments, any node 102 can search for and request hosted content. In various embodiments, only certain nodes 102—for example, authorized or registered nodes 102—may be allowed to host content.

In various embodiments, the mesh network 100 can be any type of mesh network and can operate according to any known mesh networking protocol or standard. In various embodiments, data, traffic, messages, or other communications within the mesh network 100 can be transmitted between the nodes 102. In various embodiments, data, traffic, messages, or other communications within the mesh network 100 can originate from or be intended to be received by only certain nodes 102—for example, authorized or registered nodes 102—such that non-authorized or non-registered nodes 102 only funnel data, traffic, messages, or other communications within the mesh network 100 to authorized or registered nodes 102.

In various embodiments, data, traffic, messages, or other communications within the mesh network 100 can be transmitted from an initial node to a desired recipient node through one or more intermediate nodes, with intermediate nodes passing communications intended for the desired recipient node to a next nearest neighbor node (e.g., as determined by distance or geographical location) or another node as described herein.

The mesh network 100 can provide a way to route to hosted content maintained by a node 102 on the mesh network 100. In various embodiments, one or more nodes 102 can maintain a blockchain that can be used to route to hosted content. As an example, the blockchain can include records or blocks indicating what content is hosted within the mesh network 100 and which nodes 102 may host the content, a copy of the content, and/or a cached version of the content. The blockchain may also provide indications as to a version of the hosted content and an authenticity of the hosted content.

In various embodiments, a node 102 seeking content can search the blockchain for particular content and can determine which node 102 to interact with the receive the content. In various embodiments, a node 102 seeking content can have another node 102 conduct the search on its behalf (e.g., a node that maintains the blockchain). In various embodiments, the node 102 seeking content can provide a payment to the node 102 hosting the content in order to receive the content (e.g., either before or after the content is provided). In various embodiments, the node 102 seeking the content can provide a payment to any intermediate node 102 that helps to transfer the hosted content from the hosting node 102 to the node 102 seeking the content.

In various embodiments, the blockchain can be associated with a cryptocurrency that can support a payment system useable within the mesh network 100. In various embodiments, the mesh network 100 can be provided in an area without Internet access or with limited Internet access such as, for example, a farmer's market or a festival. The mesh network 100 can provide the payment system within the mesh network 100 that does not require each node 102 to be connected directly to the Internet.

In various embodiments, only authorized and/or registered nodes 102 that may maintain the blockchain can be connected to a remote network such as, for example, the Internet. In various embodiments, a separate blockchain can be associated with a cryptocurrency that can be used as the payment system within the mesh network 100. In various embodiments, other payment systems—such as conventional payment systems—can be used within the mesh network 100.

In various embodiments, the node 102-1 and the node 102-5 can each be considered to be an authorized node on the mesh network 100. One or more of the authorized nodes 102-1 and 102-5 can maintain the blockchain. The node 102-1 can host content within the mesh network 100. The node 102-1 can post the content as a searchable transaction on the blockchain with a signature of the content added to the chain for recordkeeping. The signature can indicate the type of content hosted, the host, and a version number associated with the content. Other nodes 102 of the mesh network 100 can search the blockchain for hosted content and can determine the node 102-1 is hosting particular content of interest. The other nodes 102 of the mesh network 100 can then initiate interaction with the node 102-1—for example, through one or more intermediate nodes 102—to request access to the hosted content.

In various embodiments, the nodes 102-2, 102-3, and 102-4 can each be considered to be an unauthorized node. In various embodiments, as unauthorized nodes, the nodes 102-2, 102-3, and 102-4 can each route communications or other messages to an authorized node (e.g., the nodes 102-1 and 102-5) but cannot directly send messages to one another (e.g., the node 102-2 cannot directly send a message to the node 102-3). In various embodiments, as unauthorized nodes, the nodes 102-2, 102-3, and 102-4 may be allowed to receive and transmit communications, messages, or other traffic on a limited basis. In various embodiments, one or more of the authorized nodes 102-1 and 102-5 can determine the allowed level of participation on the mesh network 100 by the nodes 102-2, 102-3, and 102-4.

Path 104 can represent a communication path between certain nodes on the mesh network 100 (e.g., between the node 102-1 and the node 102-2). Other paths 104 between certain nodes are shown in FIG. 1 but are not labeled for simplicity. The path 104 can indicate that communication between certain nodes 102 is allowed or possible within the mesh network 100. In various embodiments, communications between the authorized node 102-1 and the authorized node 102-5 can be provided through the node 102-3—for example, the node 102-3 can relay messages between the authorized nodes 102-1 and 102-5. In various embodiments, a communication path may not be provided between the node 102-3 and the node 102-4 since each node is unauthorized and cannot directly send messages to one another. Instead, the nodes 102-3 and 102-4 may be allowed to perform only limited functions with respect to the mesh network 100 as described herein.

In various embodiments, each of the nodes 102 can be associated with a cryptocurrency wallet that can be loaded with an amount of cryptocurrency (e.g., cryptocurrency tokens). The authorized nodes 102-1 and 102-5 can issue the cryptocurrency wallets for the other nodes 102-2, 102-3, and 102-4. The authorized nodes 102-1 and 102-5 can also control access to the mesh network 100. As an example, the authorized nodes 102-1 and 102-5 can grant or deny a request by another node 102 (e.g., the node 102-2) to join and participate on the mesh network 100. In various embodiments, only authorized nodes 102 can be associated with a cryptocurrency wallet.

The authorized nodes 102-1 and 102-5 can be designated as such in a number of manners. In various embodiments, a node 102 can be considered an authorized node 102 once it holds or stores a certain amount or value of cryptocurrency. In various embodiments, a node 102 can be considered an authorized node 102 once a certain number of other nodes 102 (e.g., authorized nodes) determine the node 102 should be an authorized node. In various embodiments, a node 102 can be considered an authorized node 102 once it helps facilitate a certain number of transactions using the blockchain (e.g., helps authorize transactions based on the blockchain).

In general, to become an authorized node 102, one or more criteria must be met as described herein. Once a node 102 becomes an authorized node, the node 102 can communicate in any manner with any other node 102 of the mesh network 100, can manage participation of other nodes 102 on the mesh network including, for example, issuing cryptocurrency wallets, and can manage the blockchain. As described herein, the blockchain can be used to facilitate financial transactions and/or can be used to store information relating to hosted content—for example, by storing information related to content hosting transactions that can indicate the hosted content and its source.

In various embodiments, the authorized nodes 102 can host content and can receive payment for transmitting the content to a requesting node 102. In various embodiments, a record of the content transferred from a hosting node 102 to another node 102 (e.g., an intermediate node or a requesting node) and a payment for the transfer of the content can be stored on the blockchain. Such information can form a portion of a searchable content transaction. Other information can also be stored relating to the content transaction.

In various embodiments, unauthorized nodes 102 may be limited to routing communications and other messages to authorized nodes 102. In various embodiments, unauthorized nodes 102 can receive payments (e.g., based on the cryptocurrency) for transferring a request for hosted content from a requesting node 102 to a hosting node 102. For example, the node 102-2 may receive a payment from the node 102-5 (as a requesting node) that issues a request for content hosted by the node 102-1 (as a hosting node). In various embodiments, unauthorized nodes 102 can receive payments (e.g., based on the cryptocurrency) for transferring the requested hosted content from a hosting node 102 to a requesting node 102. For example, the node 102-2 may receive a payment from the node 102-5 for transferring requested content hosted by the node 102-1 to the node 102-5.

In various embodiments, a node 102 requesting access to or a copy of hosted content (e.g., the node 102-5) will provide a payment to the node 102 hosting the content (e.g., the node 102-1). Further, a node 102 requesting access to or a copy of hosted content (e.g., the node 102-5) will provide payment to any intermediate nodes 102 (e.g., the node 102-2) that may help transfer communications or other messages related to the request, including any response messages from the hosting node 102 and including any transfer of the requested content.

Accordingly, in various embodiments, the requesting node 102 may be required to pay higher amounts as more intermediate nodes 102 are involved—that is, the total payment owed to the intermediate nodes 102 may increase (e.g., linearly) with each intermediate node 102 involved (e.g., as the total number of intermediate nodes 192 increases). As a result, the requesting node 102 may search the blockchain for nodes 102 that are positioned closer (e.g., by distance or geographical location) that may have the content (e.g., either a copy of the original content, an acceptable different version of the content, and/or a cached copy of the content). In this way, a requesting node 102 may be able to reduce a total payment owed to intermediate nodes 102 if the content (or an acceptable version thereof) can be located at a node 102 closer to the requesting node 102—thereby avoiding payment to additional, unnecessary intermediate nodes 102.

For purposes of illustration and explanation only, five nodes 102 are shown in FIG. 1, but the number of nodes 102 capable of operating on the mesh network 100 is not so limited as any number of nodes 102 can be included within the mesh network 100. The nodes 102 can represent any type of electronic and/or computing device maintained by an operator or user including, for example, a smartphone, a tablet, a laptop, or any other consumer electronic device capable of operating as a node 102 on the mesh network 100. The operator or user of any of the nodes 102 can be a private individual or can be a business owner or purveyor such that certain nodes 102 can represent a point of sale node (e.g., a node associated with the sale of a good or service or the sale of hosted content). Accordingly, transactions can be conducted entirely within the mesh network 100 using the blockchain between a POS node 102 and an individual node 102 and/or between two individual nodes 102.

For purposes of discussion, operation of the node 102-2 is described in relation to joining the mesh network 100 and can be applicable to any other node 102 on the mesh network 100. In various embodiments, the node 102-2 can receive data or other information relating to the mesh network 100. In various embodiments, an application (app) or other program can be downloaded onto the node 102-2. The data or other information relating to the mesh network 100 and/or the downloaded app can be used to establish the electronic device and/or computing device as the node 102-2 on the mesh network 100. Other nodes 102 can also be established on the mesh network 100 in a similar manner.

After the computing device is established as the node 102-2 that is capable of operating on the mesh network 100, the node 102-2 can generate a cryptocurrency wallet. The generated cryptocurrency wallet can be stored on the node 102-2—for example, within a storage device and/or memory unit of the computing device established as the node 102-2. The cryptocurrency wallet for the node 102-2 can be issued by an authorized node 102 of the mesh network such as, for example, the node 102-1 or the node 102-5.

After generating a cryptocurrency wallet, the user of the computing device operating as the node 102-2 can load the generated cryptocurrency wallet with an amount of cryptocurrency tokens. The amount of cryptocurrency tokens can be issued by an authorized node 102 of the mesh network. As an example, the node 102-2 can provide a payment to the authorized node 102-1 in exchange for a corresponding amount of a cryptocurrency (e.g., cryptocurrency tokens). Other nodes 102 of the mesh network 100 can generate a cryptocurrency wallet and load the wallet with cryptocurrency in a similar manner.

In various embodiments, only authorized nodes 102 are allowed to conduct financial transactions and/or host or request content on the mesh network 100. In various embodiments, unauthorized nodes are allowed to also conduct financial transactions and/or host or request content on the mesh network 100.

In various embodiments, the mesh network 100 can operate without being under the control of a central authority. Instead, the mesh network 100 can be facilitated by several distributed authorized nodes 102 (e.g., the nodes 102-1 and 102-5) that manage a routing system (e.g., a blockchain) that can be used to locate hosted content on the mesh network 100, with other nodes 102 on the mesh network 100 routing content related traffic to the authorized nodes 102 to earn payments.

In various embodiments, a node 102 may join the mesh network 100 but may have limited capabilities within the mesh network 100 as regulated and controlled by the authorized nodes 102-1 and 102-5. In various embodiments, a node 102 may only be allowed to participate on the mesh network 100 after having a certain amount of cryptocurrency stored in an associated wallet, by receiving authorization to participate from one of the authorized nodes 102-1 and 102-5, or by helping to facilitate a certain number of transactions (e.g., passing messages relating to content sharing or verifying a requested financial transaction) or helping to facilitate transfer of data communications.

In various embodiments, an unauthorized node 102 can be elevated to an authorized node 102 in a similar manner—i.e., by meeting certain criteria such as, for example, by having a certain amount of cryptocurrency stored in an associated wallet, by receiving full authorization from one of the existing authorized nodes 102-1 and 102-5, or by helping to facilitate a certain number of transactions (e.g., passing messages relating to content sharing or verifying a requested transaction) or helping to facilitate transfer of data communications.

In various embodiments, an unauthorized node—such as the node 102-2—may be limited to routing any communications or messages of any type to only authorized nodes (such as the nodes 102-1 and 102-5). In various embodiments, an authorized node—such as the node 102-1—may be able to route any communication or message of any type to any adjacent or next neighbor node—for example, a node that is in closest proximity to the node 102-1 (e.g., as geographically determined or closest based on a measured distance to the node).

As described herein, in various embodiments, a node 102 can host content within the mesh network 100 and can post the content as a searchable "transaction" on the blockchain. In various embodiments, a hash of the content can be provided. The hash of the content can then be encrypted—for example, using a private key of the hosting node 102—to form a signature stored on the blockchain. In addition to the hash of the content, the signature can indicate a hosting node 102, a requesting node 102, and information (e.g., metadata) indicating the type of content and its version number. In various embodiments, the blockchain can store information related to the hosted content in a different manner such as, for example, by storing an indication of the type of content, version of the content, and the host node 102 of the content. Such information can be encrypted and can be obtainable only by nodes 102 on the mesh network 100 or by only authorized nodes 102 on the mesh network 100.

In various embodiments, each transfer of the content from a first node 102 (e.g., the hosting node) to a second node 102 (e.g., an intermediate node or a requesting node) can generate a record or block on the blockchain comprising information related to the transfer—for example, source node 102, destination node 102, content transferred, content version, etc. In various embodiments, nodes 102 on the mesh network 100 can search the blockchain for records, blocks, and/or information relating to hosted content that may be available. As an example, a node 102 may review the blockchain to determine a source node 102 that hosts the content and all nodes 102 that have requested the content and/or all nodes that have transferred the content between any two nodes 102. A node 102 may be able to determine which node 102 stores the content, which nodes 102 may have cached copies of the content, and which nodes 102 may have different versions of the original content stored. In various embodiments, a node 102 may determine from a search of the blockchain a listing of nodes likely to be storing a cached copy of the content. In various embodiments, information related to the hosted content available within the mesh network 100 can be provided within corresponding signatures stored in the blockchain.

In various embodiments, nodes 102 on the mesh network can copy the hosted content and can host the content as well. Such an occurrence can be considered to be a "fork" of the content and can be indicated as such in the blockchain. A signature associated with a record on the blockchain regarding the fork of the hosted content can verify authenticity of the content and version number. In various embodiments, when multiple copies of content are being hosting within the mesh network 100, signatures associated with the content can be reviewed to determine current versions of the content (e.g., most recent copies of the content) and/or prior versions of the content. As described herein, the mesh network 100 (and/or the nodes 102 operating within the mesh network 100) can operate with a requirement to provide a payment in order to view or be provided content.

The techniques for routing to content stored on the mesh network 100 provides access to content while avoiding requirements for remote network or Internet access by the nodes 102 of the mesh network 100. Further, the techniques for routing to content stored on the mesh network 100 avoid the need for a central authority to manage all hosted content. In various embodiments, only nodes 102 on the mesh network 100 (e.g., only authorized nodes 102) can search and be provided content, thereby providing a layer of security with regards to the mesh network 100 and the hosted content.

In various embodiments, a node 102 may search the blockchain for information related to available content with the mesh network 100. The information may be searched based on a particular node 102 (e.g., search the blockchain for content "transactions" involving a particular node 102) or based on particular content. In various embodiments, this information or a portion thereof can be provided or indicated within signatures stored in the blockchain. In various embodiments, as described herein, the signatures can store and/or indicate the hosting node 102, the content hosted, the version of the content, and who has viewed or been provided the content (e.g., other nodes 102 that have requested the content).

In various embodiments, before requesting content, a requesting node 102 can verify a hosting node 102 is still active on the network. If the hosting node 102 is no longer on the mesh network, the requesting node 102 can search the blockchain for records or data relating to the content to find another node 102 that may have a cached copy of the content or another node 102 that may also be hosting the content (or a version thereof). In various embodiments, the signatures can be encrypted for example using the encryption keys (e.g., public keys) associated with the node 102 conducting the transaction for content or hosting the content. In various embodiments, the signatures can be decrypted using keys (e.g., private keys) associated with the receiving node 102.

Figure 2:
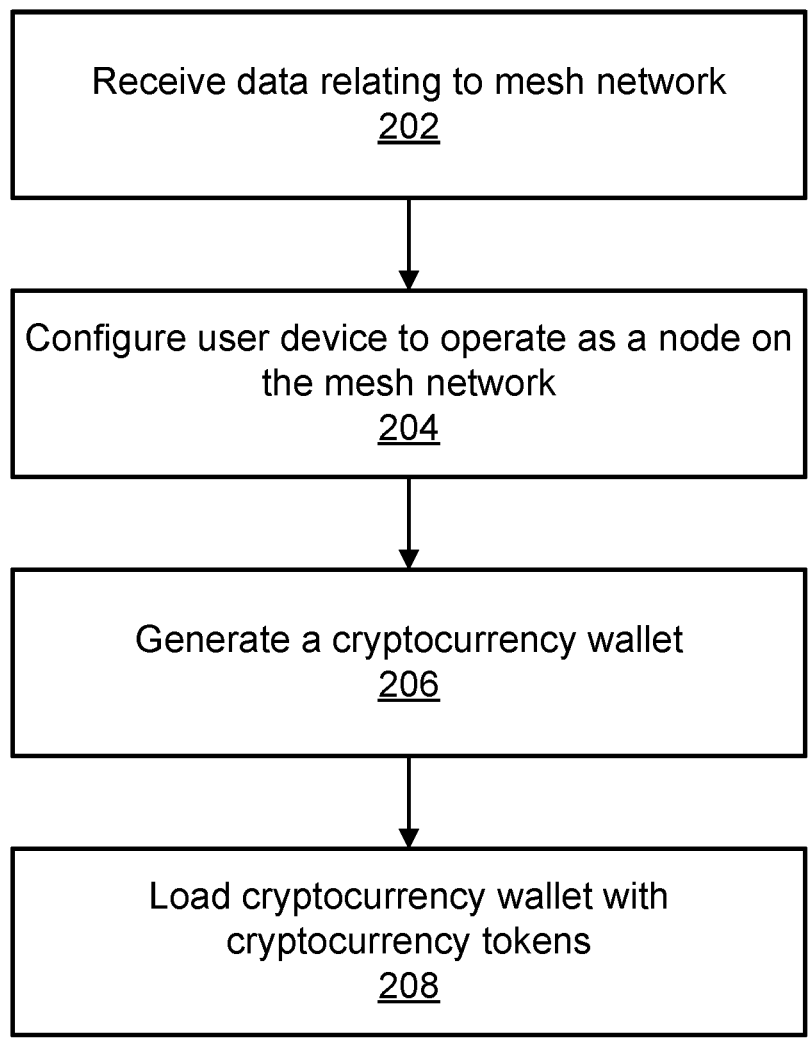
FIG. 2 illustrates a first logic flow.

FIG. 2 illustrates an example of a logic flow 200 that may be representative of techniques for enabling a computing device (or electronic device) of a user to operate as a node on a mesh network and to generate a cryptocurrency wallet to facilitate use of cryptocurrency tokens. For example, the logic flow 200 may be representative of operations that may be performed in various embodiments by any constituent component of the mesh network 100 (e.g., any of the nodes 102 such as the node 102-1) depicted in FIG. 1.

At 202, the computing device of the user can receive data relating to a mesh network. The computing device can store the received data in a storage device (e.g., a memory component) of the computing device. The computing device can be, for example, a smartphone. The user can be, for example, an attendee of an event or visitor of a venue associated with the mesh network. The mesh network can be, for example, the mesh network 100. The event or venue can be, for example, a farmer's market or a festival having limited or no Internet access. In various embodiments, the user can download an app to her smartphone. The app can include or can be used to receive the data relating to the mesh network At 204, the computing device can be configured to operate as a node on the mesh network 100 based on the stored received data. In various embodiments, the downloaded app can be used to establish the smartphone as capable of operating as a node on the mesh network (e.g., as the node 102-1). At 204, the node 102-1 can operate within the mesh network 100.

At 206, the node can generate a cryptocurrency wallet. The cryptocurrency wallet can be stored in the storage device of the node. The cryptocurrency wallet can be issued by an authorized node of the mesh network. As an example, the node 102-5 can authorize and issue the cryptocurrency wallet of the node 102-1.

At 208, the node can load the generated cryptocurrency wallet with an initial amount of cryptocurrency tokens. The initial amount of cryptocurrency tokens can be loaded into the generated cryptocurrency wallet by direct interaction with an authorized node of the mesh network. For example, the node 102-1 can provide a payment directly to the authorized node 102-5 such that the authorized node 102-5 issues a corresponding amount of cryptocurrency (e.g., cryptocurrency tokens) to the node 102-1.

In various embodiments, at 208, the node 102-1 can be considered to be an authorized node based on the amount of cryptocurrency loaded into the wallet of the node 102-1. For example, the amount of cryptocurrency can exceed a predetermined threshold that is required to ensure a node will be considered to be an authorized node.

Figure 3:
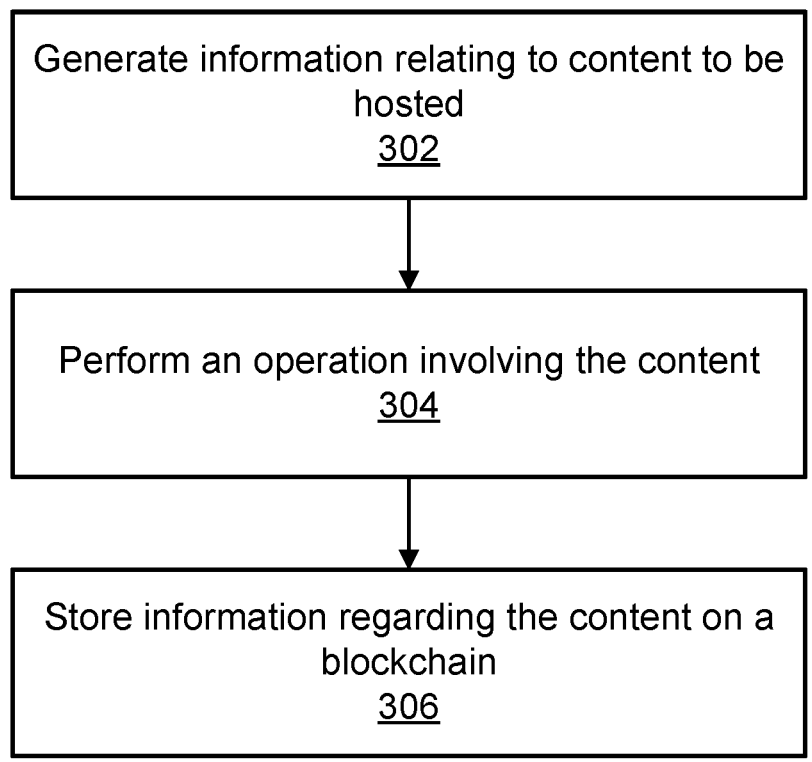
FIG. 3 illustrates a second logic flow.

FIG. 3 illustrates an example of a logic flow 300 that may be representative of techniques for identifying hosted content within a mesh network using a blockchain. For example, the logic flow 300 may be representative of operations that may be performed in various embodiments by any constituent component of the mesh network 100 (e.g., any of the nodes 102 such as the node 102-1) depicted in FIG. 1.

At 302, the node 102-1 can generate information regarding content to be hosted by the node 102-1. The content can be, as described herein, any type of file. The information generated by the node 102-1 can be information that identifies a type of the content, a type of file for the content, a version of the content, and/or any other information related to the source of the content or its nature. The generated information can identify the content (e.g., as images of cats).

At 304, the node 102-1 can perform an operation related to the content. The node 102-1 can perform an operation that relates to a transaction involving the content. The node 102-1 can perform an operation relating to the content that results in information regarding the content and/or the operation involving the content is stored on a blockchain. The blockchain can be maintained by one or more nodes 102 within the mesh network such as, for example, the node 102-5. As an example, the node 102-1 can route the content to itself as a transaction involving transfer of the content that can be indicated within the blockchain. As another example, the node 102-1 can route the content to another adjacent node—for example, the node 102-2—and then back to the node 102-1 as a transaction involving transfer of the content that can be indicated within the blockchain. At 304, a recordable "transaction" involving the content is performed such that information regarding the content and/or the operation can be or qualifies for being stored on the blockchain.

At 306, the node 102-1 or a node 102 that maintains the blockchain (e.g., the node 102-5) can store information regarding the content and/or the transaction involving the content. The information can be stored in the blockchain in a manner such that the content and/or the hosting node (node 102-1) is searchable or determinable. In various embodiments, the node 102-1 can generate a signature that can specify various information regarding the content and/or the operation involving the content. In various embodiments, the signature can indicate the hosting node (node 102-1) and a node 102 that received the content (e.g., the node 102-1 or the node 102-2).

In various embodiments, the signature can include additional information or data (e.g., metadata) regarding the content such as, for example, a version number associated with the content, a description of the content, a source for the content, a file type, etc. In various embodiments, the signature can be encrypted. In various embodiments, the signature can be encrypted using at least one of a public or private key associated with the node 102-1. In various embodiments, the signature can include a hash of the content. At 306, the signature can be stored on the blockchain for review by other nodes 102 on the mesh network indicating that the corresponding content is available.

Figure 4:
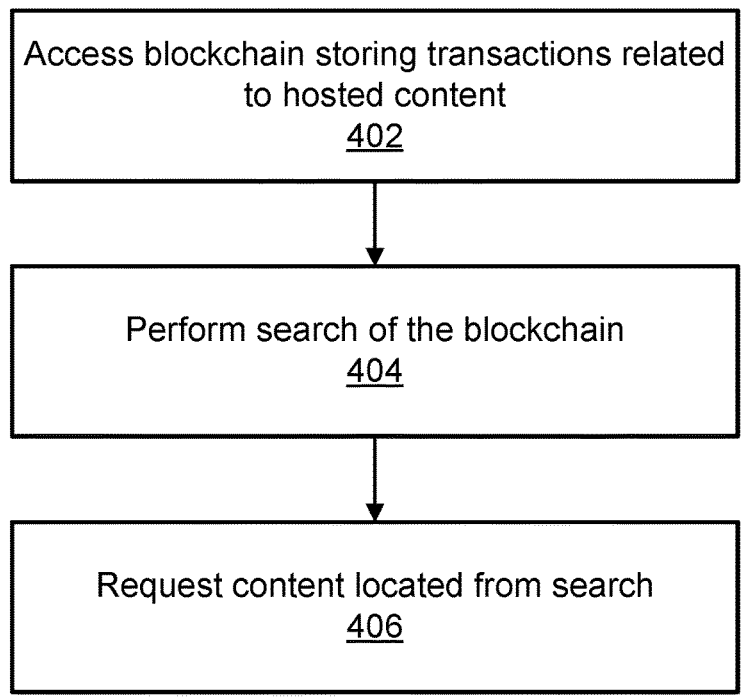
FIG. 4 illustrates a third logic flow.

FIG. 4 illustrates an example of a logic flow 400 that may be representative of techniques for locating hosted content within a mesh network using a blockchain. For example, the logic flow 400 may be representative of operations that may be performed in various embodiments by any constituent component of the mesh network 100 (e.g., any of the nodes 102 such as the node 102-1) depicted in FIG. 1.

At 402, the node 102-1 can obtain access to the blockchain. Access to the blockchain can be provided directly to the node 102-1 or can be provided indirectly—for example, through one or more intermediate nodes 102 or through one or more authorized nodes 102 and/or nodes 102 that maintain the blockchain (e.g., the node 102-5).

At 404, the node 102-1 can perform a search of the blockchain. The search can be conducted in a number of manners. In various embodiments, the node 102-1 can search the blockchain for particular hosted content—for example, based on known content or based on a description of the hosted content. In various embodiments, the node 102-1 can search the blockchain for a particular node 102 that may be involved or associated with the content—such as a known hosting node 102 (e.g., the node 102-5) or a node 102 that may have a copy of the content for hosting or a cached copy of the content. In various embodiments, the search can be conducted by reviewing signatures stored on the blockchain that contain information regarding hosted content within the mesh network 100.

At 404, the node 102-1 can determine what content hosted on the network is of interest to the node 102-1. Further, at 404, the node 102-1 can determine what node 102 hosts the content, what nodes 102 may have forked copies of the content, and what nodes 102 may have cached copies of the content. Accordingly, the node 102-1 can determine one or more nodes 102—including, but not limited to the hosting node 102-5—that may be able to provide the content to the node 102-1. The node 102-1 can also determine a version number of the content and can verify the authenticity of the content at 404.

At 406, the node 102-1 can request the content. The content can be requested from the hosting node (e.g., the node 102-5), a node 102 that may have a copy of the content, or a node 102 that may have a cached copy of the content. The node 102-1 can generate and transmit one or more request messages relating to a request for the content and can receive and process one or more response messages relating to the request for the content. The node 102-1 can reach a target node 102 that can provide the content either directly (e.g., as an adjacent node) or indirectly (e.g., through one or more intermediate nodes). The node 102-1 can issue a payment for the content before or after receipt of the content from the responding node 102 that can provide the content to the node.

As an example, if the node 102-1 (as a requesting node) determines that node 102-5 (as a hosting node) has content that the node 102-1 would like access to, then the node 102-1 can issue a request to the node 102-5 indicating the same. The request can be generated and transmitted by the node 102-1 and can be received by the node 102-2 which can pass the request on to the node 102-5. The node 102-2 can also funnel any responsive message or the content from the node 102-5 to the node 102-1. As a result of facilitating access by the node 102-1 to the content hosted by the node 102-5, the intermediate node 102-2 can receive a payment from the node 102-1. Further, the node 102-5 can receive a payment from the node 102-1 based on providing the content to the node 102-1. Accordingly, at 406, the node 102-1 can also issue payments relating to being given access to the content—to intermediate nodes 102 facilitating access or to a hosting node storing the content.

In various embodiments, one or more searches can be conducted at 404 to provide the searching node 102 with multiple options for retrieving certain content. For example, one option can relate to requesting the content from the original hosting node 102. Another option can relate to requesting a different version of the content from a different node 102 that is positioned closer to the searching node 102 such that obtaining the content may be less expensive than obtaining the content from the original hosting node 102 (e.g., the original hosting node 102 may be located further away and require more hops to retrieve the content).

Figure 5:
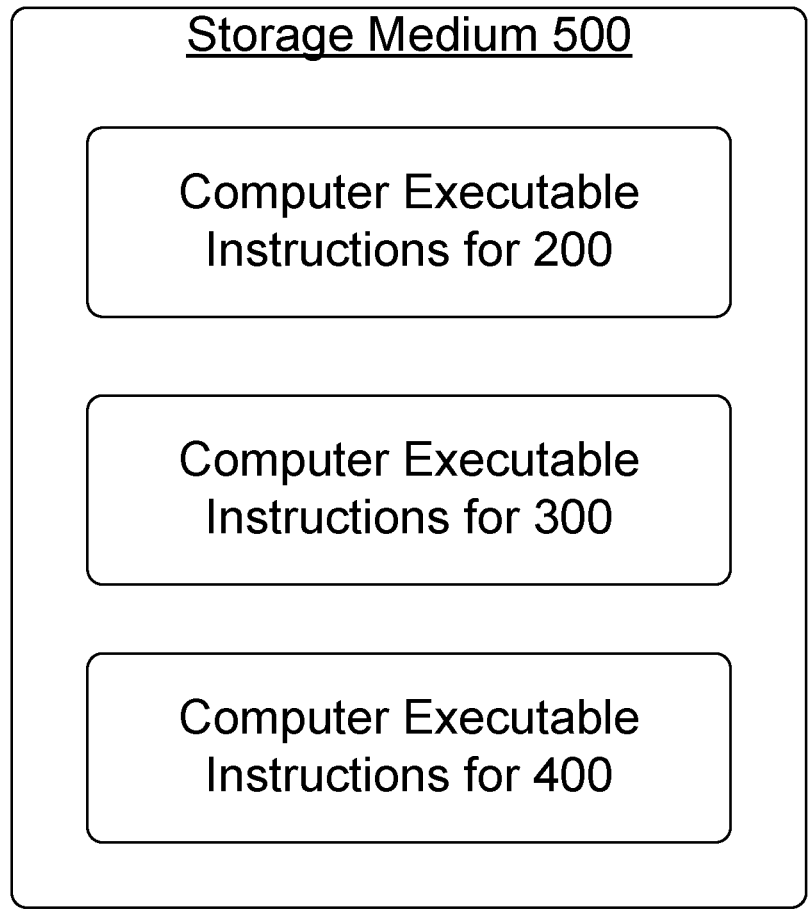
FIG. 5 illustrates a storage medium.

FIG. 5 illustrates a storage medium 500. Storage medium 500 may represent an implementation of a storage device of any electronic device and/or computing device that may operate as a node within the mesh network 100 of FIG. 1. The storage medium 500 can comprise any non-transitory computer-readable storage medium or machine-readable storage medium. In various embodiments, the storage medium 500 can comprise a physical article of manufacture. In various embodiments, storage medium 500 can store computer-executable instructions, such as computer-executable instructions to implement one or more of logic flows or operations described herein, such as the logic flow 200 of FIG. 2, the logic flow 300 of FIG. 3, and/or the logic flow 400 of FIG. 4.

In various embodiments, storage medium 500 can store computer-executable instructions, such as computer-executable instructions to implement any of the functionality described herein in relation to any described device, system, or apparatus. Examples of a computer-readable storage medium or machine-readable storage medium can include any tangible media capable of storing electronic data. Examples of computer-executable instructions can include any type of computer readable code.

Figure 6:
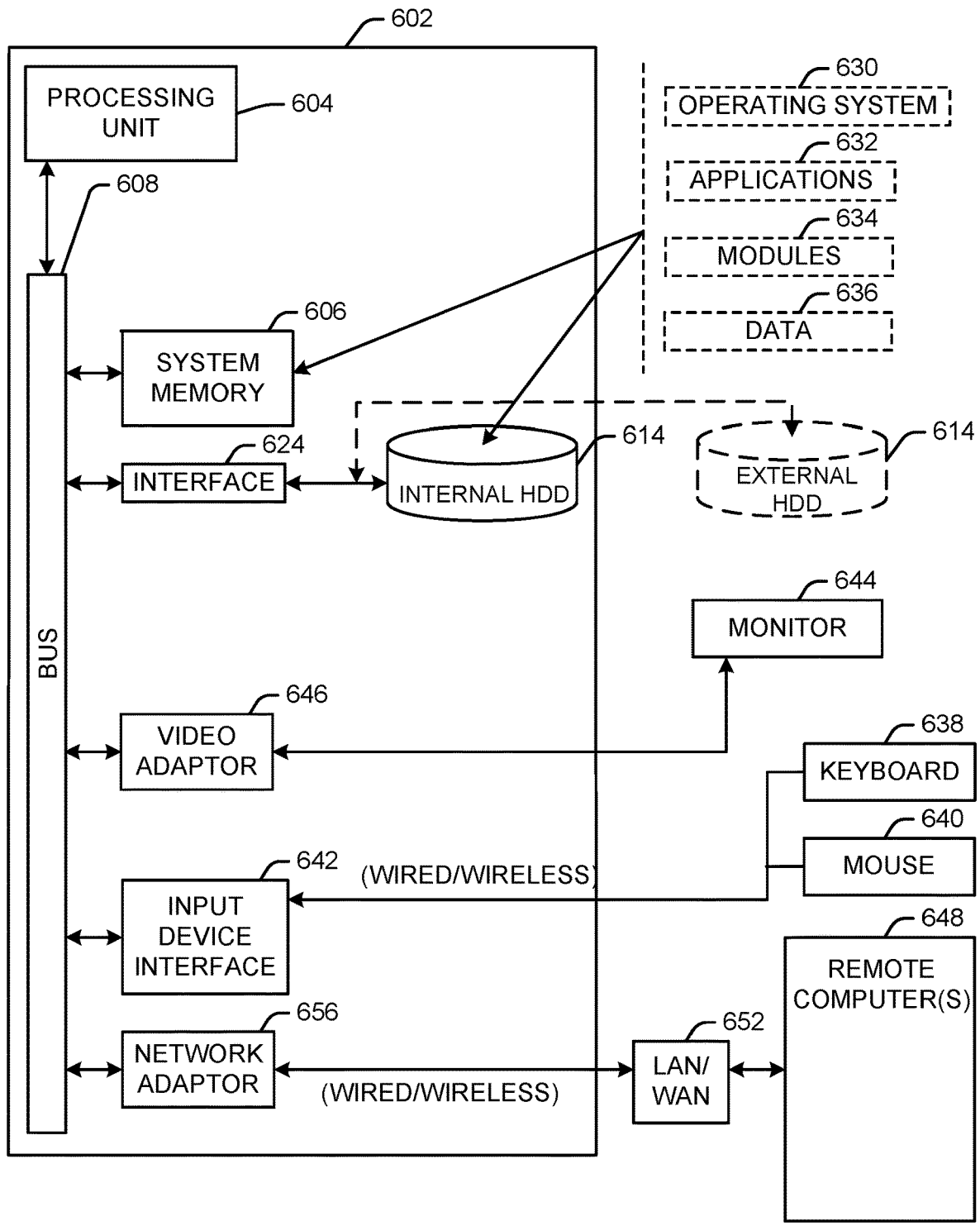
FIG. 6 illustrates a computing architecture.

FIG. 6 illustrates a computing architecture 600 that can implement various embodiments described herein. In various embodiments, the computing architecture 600 can comprise or be implemented as part of an electronic device and/or a computing device. In various embodiments, the computing architecture 600 can represent an implementation of any constituent component of the mesh network 100 depicted in FIG. 1. One or more of the constituent components of the computing architecture 600, and/or any constituent component of the mesh network 100, can be implemented in hardware, software, or any combination thereof including implementation based on a storage device (e.g., a memory unit) and logic, at least a portion of which is implemented in circuitry and coupled to the storage device. The logic can be or can include a processor or controller component.

The computing architecture 600 can include various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth.

As shown in FIG. 6, the computing architecture 600 can comprise a computer 602 having a processing unit 604, a system memory 606 and a system bus 608. The processing unit 604 can be any of various commercially available processors or can be a specially designed processor.

The system bus 608 provides an interface for system components including, but not limited to, an interface between the system memory 606 and the processing unit 604. The system bus 608 can be any of several types of bus structure that may further interconnect to a memory bus (with or without a memory controller), a peripheral bus, and a local bus using any of a variety of commercially available bus architectures.

The system memory 606 can include any type of computer-readable storage media including any type of volatile and non-volatile memory. The computer 602 can include any type of computer-readable storage media including an internal (or external) hard disk drive (HDD) 614. In various embodiments, the computer 602 can include any other type of disk drive such as, for example, a magnetic floppy disk and/or an optical disk drive. The HDD 614 can be connected to the system bus 608 by a HDD interface 624.

In various embodiments, any number of program modules can be stored in the drives and memory units 606 and/or 614 such as, for example, an operating system 630, one or more application programs 632, other program modules 634, and program data 636.

A user can enter commands and information into the computer 602 through one or more wired/wireless input devices such as, for example, a keyboard 638 and a pointing device, such as a mouse 640. These and other input devices can be connected to the processing unit 604 through an input device interface 642 that is coupled to the system bus 608. A monitor 644 or other type of display device can also be connected to the system bus 608 via an interface, such as a video adaptor 646. The monitor 644 may be internal or external to the computer 602

The computer 602 may operate in a networked environment using logical connections via wired and/or wireless communications to one or more remote computers, such as a remote computer 648. The remote computer 648 can be a workstation, a server computer, a router, a personal computer, portable computer, microprocessor-based entertainment appliance, a smartphone, a tablet, a peer device or other common network node, and typically includes many or all of the elements described relative to the computer 602. The logical connections depicted include wired and/or wireless connectivity to networks 652 such as, for example, a local area network (LAN) and/or larger networks, for example, a wide area network (WAN). Networks 652 can provide connectivity to a global communications network such as, for example, the Internet. A network adapter 656 can facilitate wired and/or wireless communications to the networks 652. The computer 602 is operable to communicate over any known wired or wireless communication technology, standard, or protocol according to any known computer networking technology, standard, or protocol.

Figure 7:
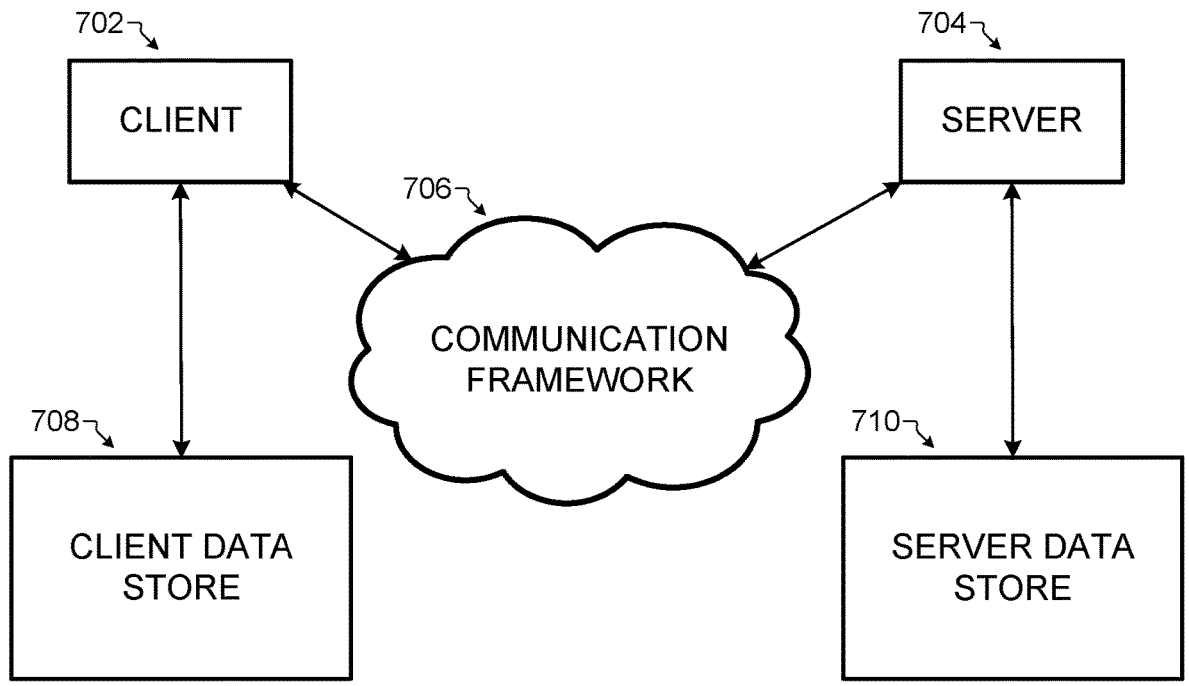
FIG. 7 illustrates a communication architecture.

FIG. 7 illustrates a block diagram of a communication architecture 700. The communication architecture 700 can implement various embodiments described herein. As shown in FIG. 7, the communication architecture 700 comprises one or more clients 702 and servers 704. One of the clients 702 and/or one of the servers 704 can represent any constituent component of the mesh network 100 depicted in FIG. 1.

The client 702 and the server 704 can be operatively connected to a client data store 708 and a server data store 710, respectively, that can be employed to store information local to the respective client 702 and server 704. In various embodiments, the client 702 and/or the server 704 can implement one or more of logic flows or operations described herein.

The client 702 and the server 704 can communicate data or other information between each other using a communication framework 706. The communications framework 706 can implement any known communications technique or protocol. The communications framework 706 can be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators), or any combination thereof. The communications framework 706 can operate over any communication media according to any networking technology including any wired or wireless communications standard or protocol, or any combination thereof.

Figure 8:
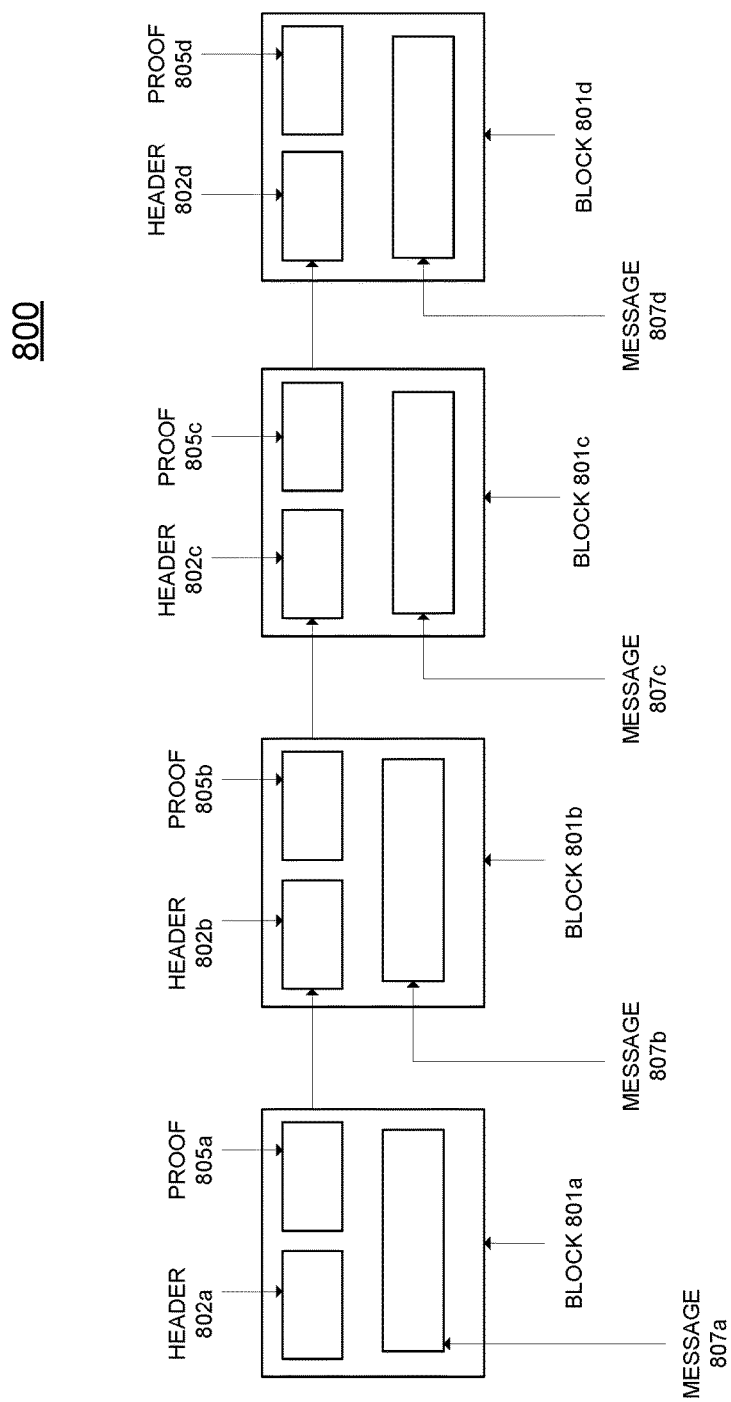
FIG. 8 illustrates a logical model of a blockchain.

FIG. 8 depicts a logical model 800 of an exemplary blockchain, consistent with disclosed embodiments. The blockchain may represent one or more of the blockchains described herein such as, for example, a blockchain that stores searchable transactions related to hosted content on a mesh network (such as the mesh network 100). The blockchain may comprise blocks, such as blocks 801a-801d. Blocks may include messages, such as message 807a-807d. Generally, blocks may include a header, such as headers 802a-802d, which uniquely identifies each block. The headers 802a-802d may include a hash value generated by a hash function. A hash function is any function that can be used to map input data of arbitrary size to a hash value of a fixed size. For example, a header may include at least one of the previous block's hash value, a hash value generated based on any messages in the block (e.g., a Merkle root), and a timestamp. Consistent with disclosed embodiments, blocks added to a blockchain described herein may satisfy at least one of a proof-of-work condition and a digital signature condition. For example, the headers 802a-802d may include a nonce chosen to ensure the header satisfies the proof-of-work condition. As a non-limiting example, the proof-of-work condition may require the hash of the header fall within a predetermined range of values. As an additional example, the header may be digitally signed with a cryptographic key of an authorized system (e.g., an authorized node 102), and the digital signature may be included in the header. This digital signature may be verified using an available key. The blocks may also include proof components, such as proof components 805a-805d. As an example, the nonce can comprise the proof components 805.

In various embodiments, the blocks 801 can store information related to hosted content available on the mesh network 100. The blocks 801 can store information indicative of a node 102 that hosts content, has a copy of the content, or has a cached copy of the content. The blocks 801 can store additional information indicating, for example, the type of content, a file type storing the content, and other metadata related to the content. Nodes 102 of the mesh network can search the blocks 801 for content or particular nodes 102 that may have content. Transactions involving transfer of the content can be stored with the blocks 801, including transfers of the content by intermediate nodes 102. The blocks 801 can each include a signature that can store the above-described information relating to the content that can be reviewed and processed by nodes 102 of the mesh network 100, with processing involving, for example, decrypting the signature and obtaining information relating to the content.

Figure 9:
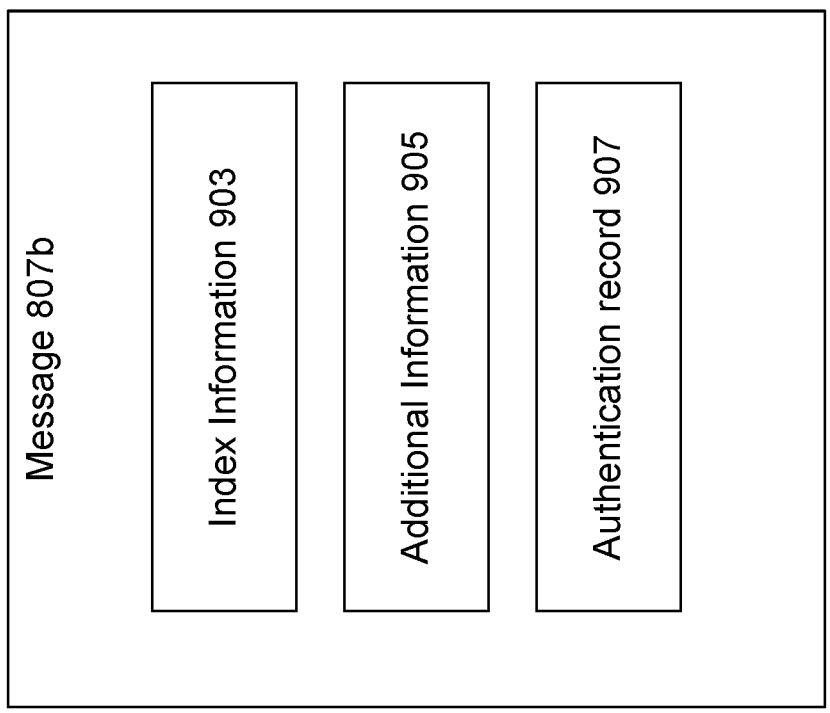
FIG. 9 illustrates a logical model of a message stored in the blockchain of FIG. 8.

FIG. 9 depicts a logical model of a message 807b stored in a blockchain (e.g., an element of blockchain depicted in FIG. 8), consistent with disclosed embodiments. In various embodiments, the messages 807 can be considered the records stored in relation to hosted content. In some embodiments, message 807b may comprise index information 903. In certain aspects, index information 903 may comprise information identifying a user. For example, index information 903 may be at least one of a full name, email address, phone number, or other non-sensitive personal information of the user. In various aspects, index information 903 may include one or more references to earlier blocks in the private blockchain. For example, index information 903 may include one or more references to one or more earlier blocks associated with the same user. A reference may include, as a non-limiting example, a hash of a preceding block in the blockchain associated with the same user. In some aspects, index information 903 may be obfuscated or encrypted according to methods known to one of skill in the art. For example, index information 903 may be encrypted with a cryptographic key. As an additional example, index information 903 may comprise a hash of the at least one of a full name, email address, phone number, or other non-sensitive personal information of the user.

Message 807b may comprise additional information 905, consistent with disclosed embodiments. The additional information 905 can be, for example, metadata or other information related to content hosted on the mesh network. In various embodiments, the additional information can include metadata relating to hosted content. In various aspects, the additional information 905 may be obfuscated or encrypted according to methods known to one of skill in the art.

Message 807b may comprise authentication record 907, consistent with disclosed embodiments. In some aspects, authentication record 907 may comprise information enabling subsequent auditing of transactions. For example, authentication record 907 may identify at least one node of the mesh network 100. In some aspects, authentication record 907 may be obfuscated or encrypted according to methods known to one of skill in the art. For example, authentication record 907 may be encrypted with a cryptographic key.

Cryptographic keys may be used to encrypt elements of messages in blocks, consistent with disclosed embodiments. In some aspects, such cryptographic keys may be associated with nodes of the mesh network 100. In various aspects, at least some of the cryptographic keys may be associated with authorized nodes 102. Corresponding cryptographic keys may be available to decrypt the encrypted message elements, consistent with disclosed embodiments. For example, when an element of a message in a block is encrypted with a symmetric key, the same symmetric key may be available for decrypting the encrypted element. As another example, when an element of a message in a block is encrypted with a private key, a corresponding public key may be available for decrypting the encrypted element, or when an element of a message in a block is encrypted with a public key, a corresponding private key may be available for decrypting the encrypted element. In various embodiments, signatures included for each block 801 can be encrypted and can be decrypted by nodes 102 of the mesh network 100.

In various embodiments, a creator of a message (e.g., a user of the computing device operating as one of the nodes 102) may determine a recipient (e.g., either an intermediate node or an ultimate end recipient of a message). In various embodiments, a recipient can be determined by providing identifying information for the recipient such as, for example, a name, a user name, an email address, a phone number, or public key for a blockchain, and/or other information.

Various embodiments described herein may comprise one or more elements. An element may comprise any structure arranged to perform certain operations. Each element may be implemented as hardware, software, or any combination thereof. Any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

In various instances, for simplicity, well-known operations, components, and circuits have not been described in detail so as not to obscure the embodiments. It can be appreciated that the specific structural and functional details disclosed herein may be representative and do not necessarily limit the scope of the embodiments.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

The invention claimed is:

1. An apparatus, comprising:
 a storage device; and
 logic coupled to the storage device, the logic to:
  determine identifying information to identify content to be stored on a mesh network comprising a plurality of nodes;
  perform an operation to host the content on a node of the mesh network, the operation including the logic to route the content to itself to generate information including the identifying information to store on the blockchain; and
  store the identifying information on a blockchain to indicate the node of the plurality of nodes hosts the content, the blockchain maintained within the mesh network.

2. The apparatus of claim 1, wherein the identifying information comprises information to identify a type of the content, identify a type of file for the content, identify a version of the content, information related to a source of the content, or any combination thereof.

3. The apparatus of claim 1, wherein the content is a video file, an audio file, an image file, a multimedia file, a file relating to a website, or any combination thereof.

4. The apparatus of claim 1, wherein the logic to store the identifying information comprises the logic to generate a signature of the identifying information and is stored on the blockchain, the signature is searchable by other nodes to locate the content.

5. The apparatus of claim 4, the logic to encrypt the signature with a key to store on the blockchain.

6. The apparatus of claim 4, wherein the signature comprises the identifying information and additional metadata.

7. The apparatus of claim 4, wherein the signature comprises a hash of the identifying information.

8. The apparatus of claim 1, the logic to perform the operation further comprises the logic to route the content to another node and then back to itself to generate information including the identifying information to store on the blockchain.

9. The apparatus of claim 1, wherein the node is an authorized node to host the content.

10. A computer-implemented method, comprising:
 performing an operation to host content on a node of a mesh network, wherein performing the operation comprises routing the content to itself to generate information including the identifying information to store on the blockchain;
 determining identifying information associated with content, wherein the identifying is searchable to find the content;
 storing the identifying information on the blockchain to indicate the node of the plurality of nodes hosting the content, the blockchain maintained within the mesh network.

11. The computer-implemented method of claim 10, wherein the identifying information comprises information to identify a type of the content, identify a type of file for the content, identify a version of the content, information related to a source of the content, or any combination thereof.

12. The computer-implemented method of claim 10, wherein the content is a video file, an audio file, an image file, a multimedia file, a file relating to a website, or any combination thereof.

13. The computer-implemented method of claim 10, wherein storing the identifying information comprises generating a signature of the identifying information, storing the signature, and wherein the signature is searchable by other nodes to locate the content.

14. The computer-implemented method of claim 13, comprising encrypting the signature with a key to store on the blockchain.

15. The computer-implemented method of claim 13, wherein the signature comprises the identifying information and additional metadata.

16. the computer-implemented method of claim 13, wherein the signature comprises a hash of the identifying information.

17. The computer-implemented method of claim 10, wherein performing the operation further comprises routing the content to another node and then back to itself to generate information including the identifying information to store on the blockchain.

18. The computer-implemented method of claim 10, wherein the node is an authorized node to host the content.

* * * * *